Figures 7, 8:
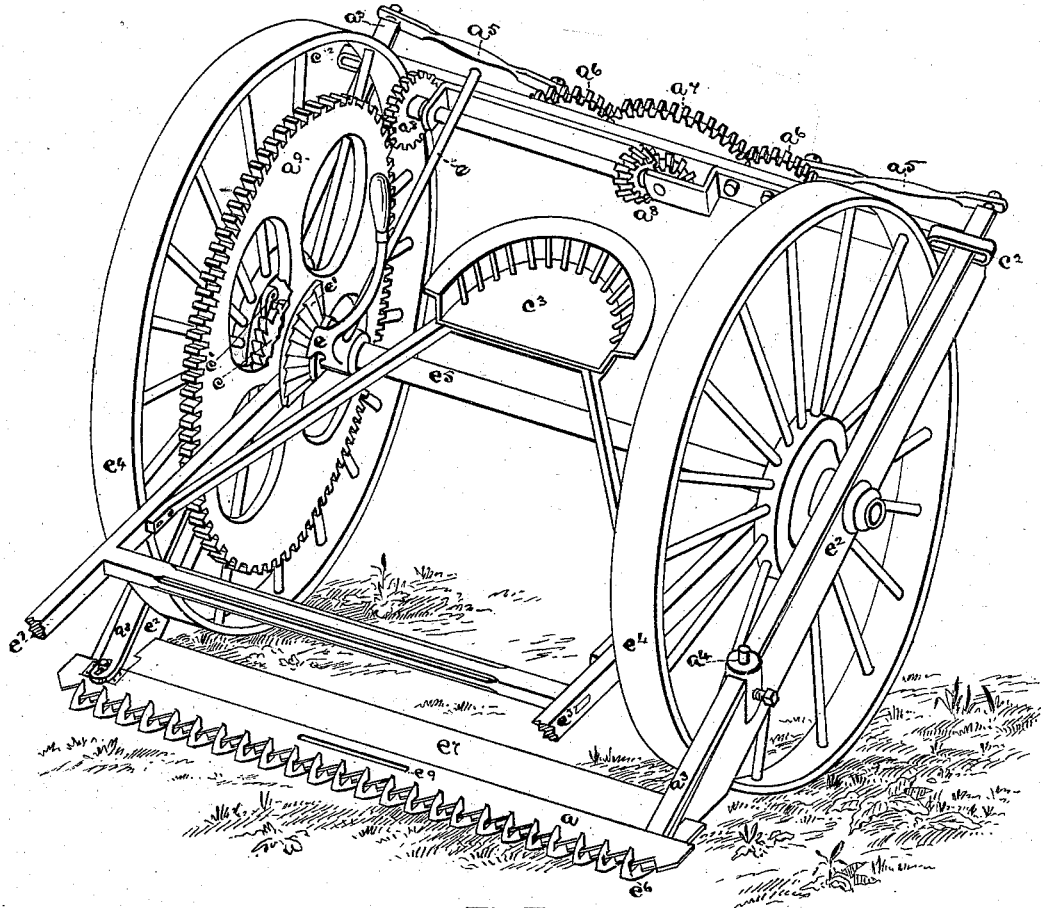

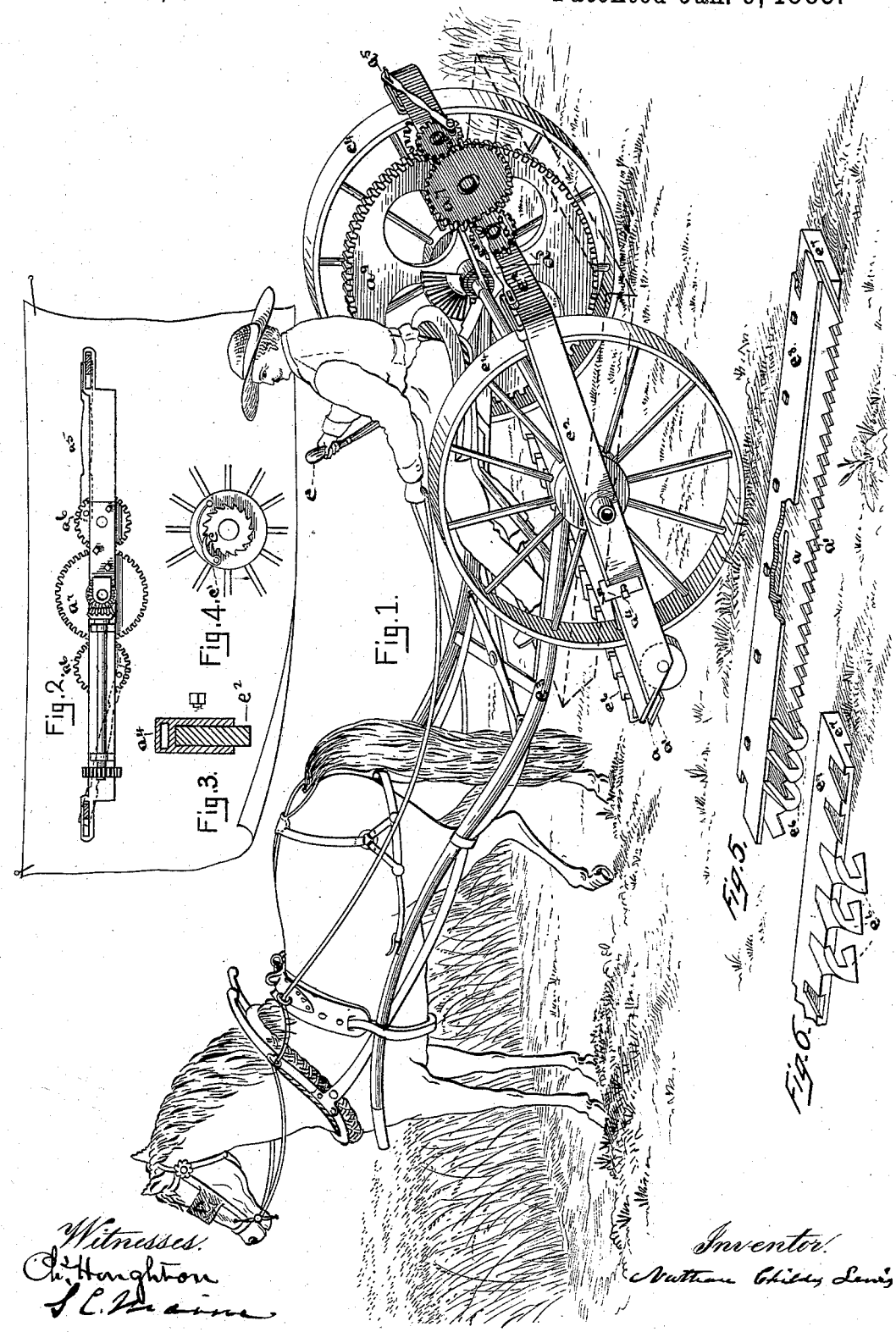

(No Model.) 2 Sheets—Sheet 2.

N. C. LEWIS.
MOWING MACHINE.

No. 270,231. Patented Jan. 9, 1883.

Witnesses: Inventor:

UNITED STATES PATENT OFFICE.

NATHAN C. LEWIS, OF BOSTON, MASSACHUSETTS.

MOWING-MACHINE.

SPECIFICATION forming part of Letters Patent No. 270,231, dated January 9, 1883.

Application filed April 3, 1882. (No model.)

*To all whom it may concern:*

Be it known that I, NATHAN CHILDES LEWIS, of Boston, in the county of Suffolk and Commonwealth of Massachusetts, have invented a new and useful Improvement in Mowing-Machines, of which the following is a specification.

My invention relates to the construction and arrangement of the frame, the cutters, and the levers and devices by which they are actuated, the object of it being to produce a mowing-machine simple and inexpensive in construction, efficient in operation, with much less motive power than is required by mowing-machines as heretofore made; and it consists in the form and arrangement of the frame of the machine, the cutters, and the devices for actuating them. The frame of the machine, supporting the cutters and guards in front, the actuating-gears on the rear, and the levers connecting the gears with the cutters on the sides of it, rests on and is supported and carried by the ends of the axle outside of the wheels of the machine. The cutters are in front of the wheels and extend outside of their path, so that both wheels run on ground which has been mowed over. I use two cutting-blades, made of thin plates of steel like saw-plates, one above and upon the other, and both extending by the whole width of the machine. Both plates are deeply serrated, and are made to move at the same time, but in opposite directions. Each cutting-blade is connected at one end with a lever, which is pivoted on the top of the side of the frame of the machine by an adjustable fulcrum. These levers extend to the back part of the frame, where they are connected with crank-gears by pitmen and adjustable pins, and the crank-gears are connected with the main gear on the carrying-wheels of the machine, and with which it moves when the machine is moved forward, by suitable intermediate gears. One horse is sufficient to draw and operate this mowing-machine, and he is harnessed to it in front of the middle of the cutting-blades.

In the drawings annexed, Figure 1 shows a perspective of the machine, with a horse and attendant, as it would appear in a field ready for use. Fig. 2 shows an elevation of the gears and pitman on the back part of the machine. Fig. 3 shows the device for pivoting the levers on the side of the frame of the machine. Fig. 4 shows a side view of the hub of the carrying-wheel, having a ratchet and pawl which connects the wheel with the main gear when the machine is moving forward, and so arranged that when the machine is moved backward the pawl runs over the ratchet and the main gear is not moved. Fig. 5 shows a perspective of the cutting-blades with their supporting-bar, to which the guards are affixed, the removable cover with device for keeping the cutting-blades in place, and guards on the supporting-bar. Fig. 6 shows a section of the supporting-bar shown in Fig. 5 reversed and the manner of affixing the guards to it. Fig. 7 is an isometric projection of the mowing-machine, partial front view. Fig. 8 shows a section of the two cutting-blades at one side of the machine.

$a$ is the upper cutting-blade—a piece of plate-steel about one-sixteenth of an inch thick, five or six inches wide, and about six feet long—serrated deeply on the forward side, the teeth beveled so as to make a cutting-edge on the under side. On one end of this cutting-blade is affixed a projection or ear on its upper side for the actuating-lever to engage or take hold of. In about the middle of the cutting-blade there is a narrow opening through the steel plates, extending about one-quarter the length of the plate, in which a stud or guide-pin works.

$a'$ is the lower cutting-blade, in all respects the duplicate of the upper cutting-blade, except the teeth are beveled so as to make a cutting-edge on its upper side, and the projection or ear for the actuating-lever to engage is on its under side. A little graphite or similar substance to prevent friction is placed between these two cutting-blades.

$a^2$ is the projection or ear on the end of the cutting-blade for the actuating-lever to engage.

$a^3$ $a^3$ are the actuating-levers by which the cutting-blades are moved. These levers are on the top of the sides of the frame of the machine, extending from their connection with the cutting-blades back to and beyond the rear of the frame, where they are connected by a pitman to the crank-gear. They are pivoted on the frame at a point near the cutting-blades, and vibrate horizontally in a guide-loop on the rear part of the side of the frame. A flat bar of iron or steel of suitable dimensions will generally be used to make these levers. The vibrating motion of these levers will always be in opposite directions—that is, when one vibrates to the right the other moves to the left, each moving the cutting-blade with which it is connected.

$a^4\ a^4$ are fulcrums on which the levers $a^3$ are pivoted. These are made to straddle the frame, and are to be affixed to it with set-screws, so that they may be readily moved toward or from the cutting-blades, as circumstances may require. By making these fulcrums adjustable the length of the power-arms of the operating-levers $a^3\ a^3$ can be varied, and this adapts them for operating the cutting-blades for different kinds of grass, heavy or light.

$a^5\ a^5$ are pitmen connecting the rear end of the levers $a^3$ with the crank-gears.

$a^6\ a^6$ are crank-gears. These gears may be made so that their throw can be changed to suit the varying lengths of the power-arms of the operating-levers, as already described.

$a^7$ is a central gear connected by intermediate gears and shaft with main gear.

$a^8\ a^8$ are intermediate gears and shaft between and connecting central gear, $a^7$, with main gear-wheel.

$a^9$ is the main gear of the machine on the axle with and moved by the carrying-wheel of the machine. This gear is fixed on the axle of the machine, and is fitted with a ratchet-wheel and pawl on its side next to the wheel of the machine, so arranged that when the machine is moving forward this gear is turned, but when it is moved backward the pawl runs over the ratchet and this gear is not moved. When this gear takes motion from the wheel it carries the intermediate gears and shaft $a^8$, and through them the central gear on the rear of the machine, (marked $a^7$,) by which the crank-gears $a^6\ a^6$ are revolved. The pitman $a^5\ a^5$, taking motion from the crank-gears, vibrates the levers $a^3$ and the cutting-blades $a\ a'$.

$e$ is a lever pivoted on the axle of the machine, by which the attendant can bring a pressure on the upper side of the rear of the frame sufficient to overbalance the weight of the front part of the frame and the cutting-blades and devices connected therewith and raise the front part of the machine up from the ground, so that it can be driven from place to place. The same motion of the lever throws the machine out of gear, so that the cutting-blades will not be moved while it is in this position.

$e'$ is a segment of a ratchet-wheel, which engages the lever $e$ when the forward part of the frame is raised up and keeps it in that position until released by the attendant.

$e^2$ is the frame of the machine, which rests on the ends of the axle outside of the wheels, and supports on its front the cutting-blades, supporting-bar, guards, and cover, and on its sides the levers by which the cutting-blades are moved, and on its rear part the shaft and gears communicating motion from the main gear to the levers. This frame may be made of wood or of metal.

$e^3\ e^3$ are the guiding-shafts of the machine.

$e^4\ e^4$ are the carrying-wheels of the machine.

$e^5$ is the axle of the machine.

$e^6$ represents guards in front of the cutting-blades.

$e^7$ is a supporting-bar across the front part of the machine, to which the guards are affixed and on which the cutting-blades rest and move.

$e^8$ is a cover or cap-plate over the cutting-blades, which is firmly affixed by screws to the supporting-bar $e^7$, and has a stud or guide-pin on the under side of it, which works in a longitudinal slot in the cutting-blades.

$e^9$ is a longitudinal slot through the cutting-blades, in which a stud on the under side of the cap-plate $e^8$ works, guiding the cutting-blades when in motion. There may be more than one of these slots in the cutting-blades, if necessary.

$c$ is a ratchet-wheel on the hub of the carrying-wheel of the machine, which engages a pawl on the main gear and carries it around when the machine is moving forward.

$c'$ is the pawl on the main gear, which engages the ratchet-wheel $c$.

$c^2\ c^2$ are loops on the rear part of the frame of the machine, in which the levers $a^3\ a^3$ vibrate, and which serve to keep the levers in their places.

$c^3$ is the attendant's seat.

When this machine is being moved forward with the front end of the frame down in position to mow, the cutting-blades are both vibrated longitudinally, moving in opposite directions, the cutting-edges of the teeth moving by each other and cutting off the grass between them, thus giving the advantage of two cutting-edges in motion toward each other.

I am aware that direct-draft mowers are old, that mowers have been provided with an operating-lever driven by gearing, and also that a harvester has been patented having its operating-lever furnished with an adjustable fulcrum. None of these is of my invention. My device possesses all the advantages of these constructions, and is capable of and adapted to better and more beneficial uses. The operative gearing of the levers being placed way back gives a good and effective sweep to the levers, so that the cutting-blades work easily, thereby making the machine run easily, and by balancing the action it cuts evenly and squarely.

I claim as new and my invention—

As an improvement in mowing-machines, a machine having the following parts, to wit: a frame, $e^2$, arranged outside of the wheels and in front and rear, the cutting-blades $a\ a'$ in front, the levers $a^3\ a^3$ at the sides, the sliding adjustable fulcrums $a^4\ a^4$, the connecting-rods $a^5\ a^5$, crank-gears $a^6\ a^6$, and center wheel, $a^7$, arranged at the rear of the frame, and means, as set forth, for actuating said center wheel from the main driving-wheel, all constructed as and for the purpose set forth.

NATHAN CHILDES LEWIS.

Witnesses:
CHS. HOUGHTON,
S. C. MAINE.